United States Patent
Dakss et al.

(10) Patent No.: US 6,642,940 B1
(45) Date of Patent: Nov. 4, 2003

(54) MANAGEMENT OF PROPERTIES FOR HYPERLINKED VIDEO

(75) Inventors: Jonathan Dakss, Cambridge, MA (US); V. Michael Bove, Jr., Wrentham, MA (US); Nuno Vasconcelos, Cambridge, MA (US); Edmond Chalom, Highland Park, NJ (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/518,588

(22) Filed: Mar. 3, 2000

(51) Int. Cl.[7] .................................................. G06F 3/00
(52) U.S. Cl. ...................... 345/723; 345/719; 345/760; 715/500.1
(58) Field of Search ................................ 345/716, 719, 345/723, 760, 721, 726, 764, 846, 856, 859, 854; 707/501.1; 382/203, 209, 190, 199, 180, 173; 715/500.1

(56) References Cited

U.S. PATENT DOCUMENTS

| | | | |
|---|---|---|---|
| 5,021,770 A | * 6/1991 | Aisaka et al. | 345/156 |
| 5,208,909 A | * 5/1993 | Corona et al. | 345/642 |
| 5,388,197 A | * 2/1995 | Rayner | 345/723 |
| 6,219,048 B1 | * 4/2001 | Miller et al. | 345/716 |
| 6,229,541 B1 | * 5/2001 | Kamen et al. | 345/719 |
| 6,282,317 B1 | * 8/2001 | Luo et al. | 383/203 |

OTHER PUBLICATIONS

Bove, et al., Adding Hyperlinks to Digital Television, Proc. 140th SMPTE Techni–cal Conference, 1998.
Chalom, Statistical Image Sequence Segmentation Using Multidimensional At–tributes, Massachusetts Institute of Technology Philosophy Thesis, Jan. 1998.
Chalom et al., Segmentation of an Image Sequence Using Multi–Dimensional Im–age Attributes, Proc. ICIP–96, Sep. 1996.
Vasconcelos et al., Learning Mixture Hierarchies, NIPS '98 (1998).

* cited by examiner

Primary Examiner—John Cabeca
Assistant Examiner—Kieu D. Vu
(74) Attorney, Agent, or Firm—Testa, Hurwitz & Thibeault, LLP (57) ABSTRACT

The process of identifying and associating information with objects in a hyperlinked video sequence is automated by creating an accessible list of object information, including semantic representations, which updates with the identification of new objects. Because objects appear in more than one shot in many video sequences, the invention makes guesses about the identification of objects in a newly segmented sequence. If it guesses the object correctly, the author is relieved of the need to manually search a database of object information to make the association.

24 Claims, 5 Drawing Sheets

|  | OBJECT 1 | OBJECT 2 | OBJECT 3 | ... | OBJECT n |
|---|---|---|---|---|---|
| OBJECT 1 | 1 | 0 | 1 |  | 1 |
| OBJECT 2 | 0 | 2 | 2 |  | 0 |
| OBJECT 3 | 1 | 2 | 2 |  | 0 |
| ⋮ |  |  |  |  |  |
| OBJECT 4 | 1 | 0 | 0 |  | 1 |

MANAGEMENT OF PROPERTIES FOR HYPERLINKED VIDEO

FIELD OF THE INVENTION

The present invention relates to video presentation, and in particular to association of properties, such as hyperlinks, with video frames and portions thereof.

BACKGROUND OF THE INVENTION

Hyperlinked video is video in which specific objects are made selectable by some form of user interface, and the user's interactions with these objects modify the presentation of the video. Users of the World Wide Web have become accustomed to hyperlinks, in which "clicking" on a word or graphic selects another page, or perhaps modifies the current one. The idea of hyperlinked video, in which objects are selectable, has often been discussed as a desirable possibility—implementing, for example, a fashion program in which clicking on an article of apparel provides information about it, or a nature program that allows children to go on "safari" and collect specimens. Creating such video has posed a challenge because of the tediousness of identifying the clickable regions in every frame manually, the difficulty of segmenting and tracking them automatically, and the need to painstakingly associate each clickable object with the linked information (e.g., an ID number, text string, or "action").

The problems of identification, segmentation, and tracking have recently been addressed using easily defined "segmentation masks"; see Bove et al., "Adding Hyperlinks to Digital Television," Proc. $140^{th}$ SMPTE Tech. Conf. (1998) (hereafter "Bove et al."); and Chalom et al., "Segmentation of an Image Sequence Using Multi-Dimensional Image Attributes," Proc. ICIP-96 (1996) (hereafter "Chalom et al."). In accordance with this approach, during editing the author uses a computer mouse to scribble roughly on each desired object in a frame of video. In response, the system generates a filled-in segmentation mask for that frame and for temporally adjacent frames in the sequence, until the occurrence of a scene change or entry of new objects. These masks associate every pixel in every frame of the video to one of the author's defined regions. The author may then associate each region with a particular action (e.g., a graphical overlay, display of information, switching to a different video data stream, or transmission of data on a back channel). The viewer of the video segment can select objects by any of a variety of means, including ordinary remote controls or remote controls with inertial sensors, or by means of a laser pointer aimed at a screen.

In operation, color, texture, motion, and position are employed for object segmentation and tracking of video. While the author is indicating regions of importance by scribbling with the mouse, the system uses a combination of these features to develop multi-modal statistical models for each region. The system then creates a segmentation mask by finding entire regions that are statistically similar and tracking them throughout a video scene. A scripting language for object-based media enables the association of the mask with the video frames, and the association of actions with selected regions at particular times.

Not addressed by this system, however, are the tasks of relating objects in different shots to each other and establishing the hyperlinks themselves—i.e., the associations between each object in a segmented shot and the information specified by the link. In other words, while the segmentation approach allows objects to be defined within the sequence of frames constituting a shot or scene, it cannot relate those objects to the objects in a different scene. The user of such a system would be forced to manually identify each object in each scene—a highly redundant, time-consuming chore, but a necessary one if hyperlinks are to remain associated with the same objects from scene to scene.

DESCRIPTION OF THE INVENTION

BRIEF SUMMARY OF THE INVENTION

The present invention automates the process of identifying and associating information with objects defined in a video sequence. In particular, a system in accordance with the invention creates an accessible list of object information, including semantic representations, which updates with the identification of new objects. Because objects appear in more than one shot in many video sequences, the system makes guesses about the identification of objects in a newly segmented sequence. If it guesses the object correctly, the author is relieved of the need to manually search a database of object information to make the association.

In a first aspect, therefore, the invention comprises a method of identifying objects in a new, as-yet unclassified video frame based on previously identifed objects. First, the video frame is analyzed to locate objects therein (preferably using the segmentation-mask approach). Located objects are modeled in terms of probability density functions ("PDFs") with respect to one or more features of the object—for example, color (which may be represented as luminance and chrominance parameters), texture, motion from frame to frame, and position within the current frame. The previously identified objects are similarly modeled as PDFs with respect to one or more features thereof, and the invention performs a comparison among PDFs to locate previously identified objects corresponding to the new objects. If such corresponding objects are successfully found, their identities are assigned to the new objects. To facilitate fast and accurate comparison, the PDFs associated with new and previously identified objects may be organized hierarchically, with higher-level PDFs representing composites of the PDFs associated with individual object occurrences.

In another aspect, the invention utilizes a database to organize various values of feature parameters associated with the objects in order to assist in classifying a new, as-yet unidentified object. Again, using color as an exemplary feature, the database may be organized into sets of data "bins" corresponding to values (or value ranges) for the parameters according to which color is modeled. Color in digital video is ordinarily represented by three components according to any of various color coordinate systems (sometimes called "color spaces"); in accordance herewith, each such component represents a separate feature parameter—i.e., one of the constituents used to model the feature "color." Thus, a separate set of data bins is defined for each color component, and the individual bins of a set represent defined values of the component. Additional sets of bins can be established for other features (texture, motion, position, etc.) useful in distinguishing among objects.

Once an object is segmented, it is analyzed to derive overall values for the feature parameters for which bin sets have been defined. The object is then associated with bins having values that accord with the values found for the object; for example, a pointer to the object may be placed in each bin having a value matching (or closest to) the corresponding feature-parameter value of the object, or having a value range that encompasses this feature-parameter value. This scheme facilitates rapid index searching to identify previously classified objects as candidate matches to a new object. When a new object is encountered, its feature parameters are derived, and previously identified objects within the bins indexed by the new object's feature parameters represent the strongest possibilities for a match—particularly objects commonly within all bins indexed by the new object. In general, however, exact matches are not sought. Rather, the bins having a selected proximity to (i.e., within a defined number of bins of) the bins indexed by the new object are considered, and previously identified objects commonly within this allowed range of bins for each bin set are considered the strongest possibilities for a match. This technique is useful as a supplement to the PDF search method discussed above, or may be used alone or in conjunction with other search methodologies.

In still another aspect of the invention, the space of possible object matches is narrowed by organizing an "occurrence database" that tracks which objects co-occur within a frame. This approach usefully supplements searches based on object features, since many disparate objects possess similar feature properties such as colors and textures; for example, a woman's neck and arm—which may desirably be represented by two separate objects—will likely yield very similar visual information. The object-occurrence database of the present invention may keep track of which objects appear in frames with all other objects, and in how many frames each object appears. This information can be used to help choose among candidate objects so that objects that have appeared in frames or shots with the as-yet unclassified object are favored as possible matches. Once again, this technique can be used alone as a rough guide to possible object matches, or before or after application of another search technique to further narrow the possibilities.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE PREFERRED EMBODIMENTS

Figure 1:
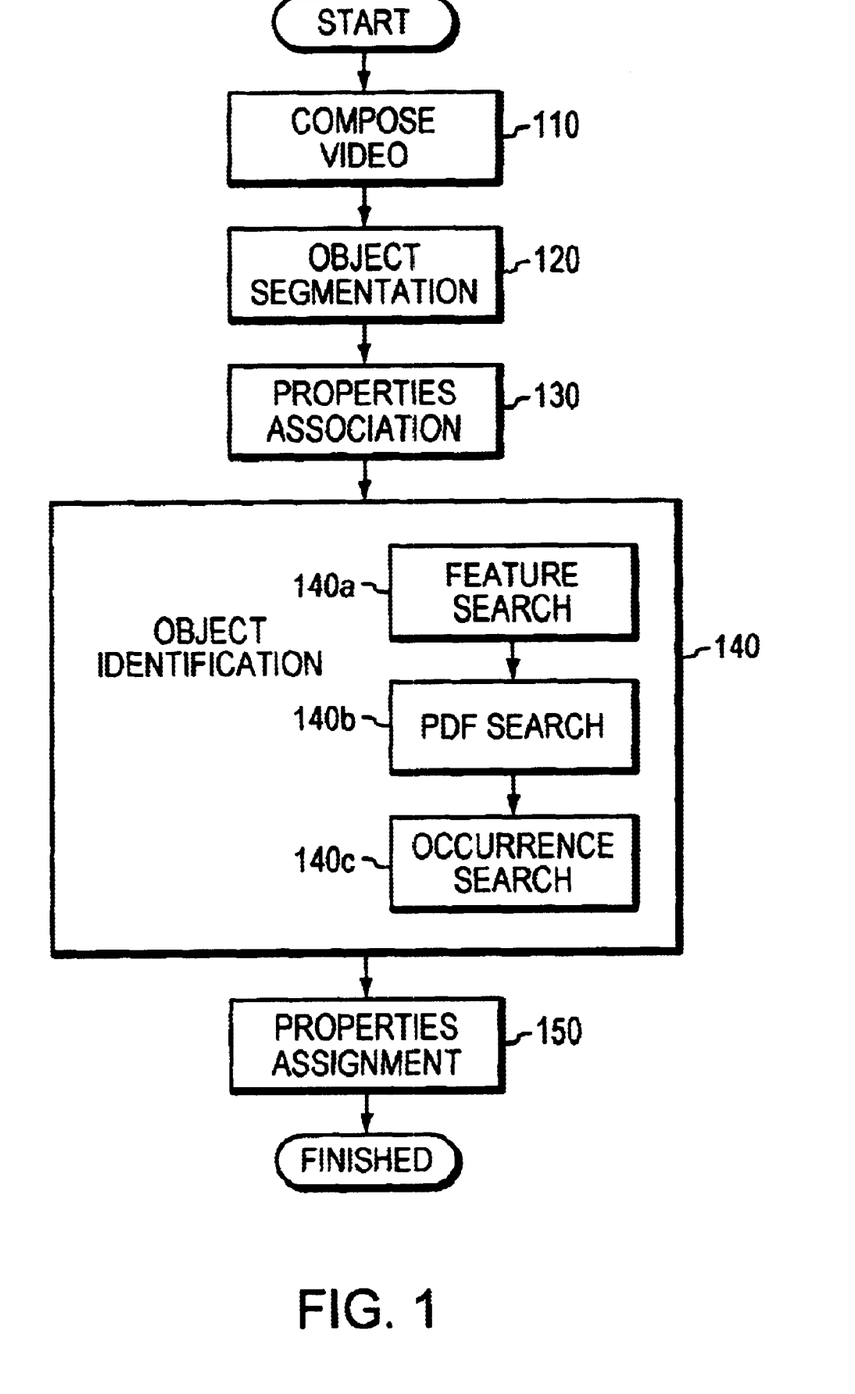
FIG. 1 is a flow chart illustrating the basic operations of the invention.

Refer first to FIG. 1, which illustrates the basic operations of the invention. In a first step 110, a video sequence is recorded and, typically, composed into a sequences of scenes and shots. As used herein, a "shot" refers to a sequences of successive frames created by a single camera. In step 120, objects within the video frames are located. Each frame of a shot is analyzed and "segmented" into regions. Initially, these regions acquire object identities through the action of the author, who identifies and labels them. In some segmentation approaches, every pixel within a frame is classified as belonging to an object. The author also defines the properties to be associated with some or all of the objects (step 130), most notably assigning actions, such as hyperlinks, to be taken when an object is selected during viewing. New frames are then analyzed and segmented, and based on comparison with the author-defined objects, classified as a previously identified object or a new object. If the object has previously been identified, the properties associated with the already-classified object are assigned to the new object corresponding thereto. In the case of a new object, the author may assign properties directly. Object properties are maintained in a database so that when objects are selected during viewing, the actions associated therewith may be executed.

The ensuing discussion describes the various aspects of the invention in greater detail.

1. Segmentation

The manner in which objects are located within video frames is not critical to the present invention. What follows is a description of a technique that is naturally suited to the approach taken by the preferred embodiment of the invention. This approach is described in greater detail in Bove et al., Chalom et al., and Dakss, "HyperActive: An Automated Tool for Creating Hyperlinked Video," M. S. Thesis, Massachusetts Institute of Technology, September 1999.

Raw video is first "temporally segmented," i.e., broken up into its constituent shots. Differences between pixel values in temporally adjacent frames are computed, summed, and compared to a threshold value. If the threshold is exceeded, the two frames are likely to be on either side of a shot boundary. If not, they are probably both within the same shot. Once this process is repeated for all pairs of temporally adjacent frames, it is possible to identify and track the objects that appear in each shot.

The author assists in defining the objects in each shot by providing "training data" in the form of rough scribbles on each object in one or more frames in each shot. The system creates a statistical model for each object based on feature parameters calculated from the training data. These models are then used to classify each of the remaining pixels in the frame as a member of the object with the highest statistical similarity. By tracking the training data bi-directionally (i.e., forward and backward in time) and applying the same operations, several seconds worth of video can readily be segmented.

Unlike many segmentation systems that use only one or two different features to help distinguish objects, this system allows the author to select any combination from a variety of different features that estimate the color, motion, and texture properties of each pixel. The row and column positions of a pixel in the frame may also be used as features. Combining the data of several features in this way yields a more robust segmentation whose quality is less affected by misleading data from a single feature.

Color: Color in digital video is typically represented by three components, and a single color can be represented in any one of many color coordinate systems. The present invention may analyze color in any one or more of the various well-known color spaces, e.g., RGB, YIQ, LAB, and YUV. A simple matrix conversion equation is needed to calculate the YIQ values for a particular pixel in the RGB color space. Calculating the LAB values for an RGB pixel requires an intermediate transformation to the CIE-XYZ space. Although each color space presents different advantages for gleaning the color properties of an object in video, YIQ and LAB have been found to yield more accurate segmentation when used in this system.

Motion: A constant-brightness constraint (or "optical flow") method may be used to compute a vector that describes the motion of a pixel in a video sequence. As is well understood in the art, optical flow estimates the apparent motion of regions between two successive frames in an image sequence by measuring the change in the brightness pattern between those frames. A brightness change constraint equation for each pixel can be used to represent the weights of small changes in the pixel's intensity in position and time. The equation can then be solved using a least squares error calculation over a local region. See Krause, "Motion Estimation for Frame-Rate Conversion," PhD Thesis, Massachusetts Institute of Technology, June 1987. It should be understood that the foregoing technique is representative only; any of various known techniques for obtaining a motion vector field, such as block matching, can instead be employed.

Texture: The system uses two different statistical methods to determine texture characteristics of objects in each frame. These methods were chosen for use in the multi-feature system because they represent texture in a concise manner and can be run relatively quickly. Although texture calculations exist which are based on interframe, intra-frame measurements are utilized for texture estimation since motion information is incorporated during the segmentation stage. The first method computes the mean and standard deviation of the luminance values of pixels within a specified window size and assigns these values to the pixel at the center of the window. This computation is not restricted to luminance-based color spaces, however, and local statistics within a window can be obtained for the channels of any desired color space. The second method, known as "simultaneous autoregression" and described in Jain et al., "Texture Classification and Segmentation Using Multiresolution Simultaneous Augoregressive Models," *Pattern Recog.* 25: 173–188 (1992), uses a linear prediction method to express each pixel in a video sequence as a function of its eight neighboring pixels. Because of symmetry properties, it is possible to represent this function with only four coefficients and an error value. To best estimate these parameters, a least squares error solution is employed which incorporates pixel values within a larger window size.

Once again, this approach is representative only; essentially any texture description that produces local numerical vectors representing texture parameters can be employed to advantage.

Before a shot is segmented, the author may be asked to indicate the feature or features upon which the segmentation is to be based. For example, inexperienced users might simply choose "color" and "texture" while advanced users can choose among color spaces and specify texture resolution.

In the next stage, the author selects representative frames from the sequence (typically ones in which the important objects are fully visible) and highlights representative pixels inside of each object using a simple drawing tool. This information serves as the training data for the segmentation algorithm. The system estimates the location of the training data pixels within each of the remaining frames in the sequence by means of motion estimation. In particular, an optical-flow computation calculates motion vectors for the training pixels; these vectors are then applied to the pixels to estimate their location in neighboring frames.

The preferred tracking algorithm allows the author to provide training data for multiple frames in a single sequence. Using this information, the system tracks training data both forward and backward through the sequence of frames. Bi-directional tracking makes it possible to efficiently segment objects entering frames; the author can train the system using a frame in which the object is visible and the system then tracks that object backwards until it is out of view. Once the tracking has completed, there are pixels in each frame that have been classified to correspond to the objects defined by the author.

After a multi-dimensional feature vector has been calculated for every pixel in the video sequence, the feature information for the tracked pixels is incorporated into a statistical model for each region. The feature information of each unclassified pixel will then be compared to these models, and the pixel will be labeled as a member of the region to which it bears the greatest statistical similarity. Basically, the feature information is used to express each region as a mathematical function such that feature values of unclassified pixels receive a probability of corresponding to a particular region.

Each feature of each region is modeled as a probability density function (PDF) in which the shape of the model is assumed to be a multimodal Gaussian distribution. To model a multimodal PDF for the values of one feature for the pixels in one region, the number of Gaussian modes in the PDF is estimated, and the weight, mean and standard deviation of each mode are computed. This is accomplished using the Expectation Maximization (EM) algorithm, which is applied iteratively to compute these values for PDFs with different numbers of modes; the function that most accurately represents the training data is then selected. To determine this accuracy, the change in Kullback Liebler (KL) distance of the PDFs in order of increasing number of modes is computed, and the PDF for which there is maximal change is chosen.

Once PDFs representing the distribution of pixel values of each feature for each region have been established, the Likelihood Ratio Test (see, e.g., Therrien, *Decision Estimation and Classification* (1989)) is used to classify each pixel that was not labeled by the author or by the tracking process described above. Essentially, the system calculates a joint product of the results of inputting each value of a pixel's feature vector into its respective PDF for a particular region. The result of repeating this process for each region is a product representing the probability that the pixel is a member of each region.

The pixel is classified to the region corresponding to the largest product. These labeled pixels collectively constitute a "segmentation mask." The ratio between the highest product and the second-highest product is used to represent the system's "certainty" of a pixel's classification and can be incorporated during the postprocessing stage described below.

Although statistical models based on the positions of pixels can be used, they do not prevent the system from classifying a pixel as a member of an object whose training pixels are wholly located on the opposite side of the frame. This is because separate models are generated for the row and column position information for an object, meaning that a pixel whose color, texture and motion characteristics are similar to pixels of an object located in a nearby row but distant column could be labeled as a member of that object. To help eliminate this problem, position may be used as a stronger weighting factor of the joint products produced for each region when classifying a pixel. For each frame, a bounding box is computed for the training pixels of each region. After the joint products have been computed for each region, the standard deviation of these values is found and each value is then decreased by the product of the standard deviation and the ratio of the pixel's distance to the nearest edge of the corresponding region over the distance between one edge of the frame to the other. This method does not produce any sharp "bounding box" effects in segmentation masks and instead gradually decreases the probability of pixels belonging to a region as pixels increasingly distant from that region are examined.

The result of these operations is association of all pixels in the sequence with regions as defined by the author. Because only statistical methods have been employed, small aberrations will appear in otherwise consistent classification, such as a small group of mislabeled pixels surrounded by properly classified pixels. A postprocessing stage is preferably employed to help rectify these anomalies.

To help remove small groups of misclassified pixels, the system a process which "unclassifies" each pixel which was originally classified with a certainty below a set threshold. A second algorithm, known as "K-nearest neighbor" (KNN), assigns each remaining unlabeled pixel to the region which is most popular among its neighboring pixels.

2. Linkage

The last step in the authoring process is to link the defined objects with the actions that should be taken when a viewer selects them. Selecting an object might, for example, cause a graphic overlay to appear containing a description of the object, or cause a new video clip to be displayed. Linking objects with actions involves creating a system for associating each object with some kind of data, such as a URL, a procedure, an image, identifying or classification information, or a structure containing several separate pieces of data.

3. Identification of New Objects

The preferred embodiment of the invention utilizes the PDFs generated for purposes of segmentation in order to establish and search a database of objects. Color has been found to be the most desirable feature upon which to base PDF modeling for purposes of facilitating subsequent object searching. This is because texture information is sensitive to scale, as an object appearing in a "close-up" frame tends to possess texture characteristics different from its appearance in a "medium shot"; and motion and spatial position are useful metrics for identifying regions within temporally adjacent frames but lose their significance when comparing shots, such as ones featuring the same object at different camera angles. Luminance/chrominance color spaces such as YIQ or YUV, which model luminance (Y) and chrominance (I,Q or U,V), are preferable to spaces such RGB because more lenience can be accorded to luminance information than chrominance information during searches. This helps to account for cameras' sensitivity to shadowing and changes in light.

To facilitate efficient object searching, the present invention combines an object's feature information—gathered from multiple occurrences—into a single descriptor. That descriptor must, however, be sufficiently robust as to guarantee, to some reasonable level of confidence, that it will be selected when appropriate during a search. Objects will most likely appear in multiple shots. Accordingly, all of the YIQ PDFs computed for an object in each shot are used to create a "virtual" or composite PDF to use in searches. This is accomplished using a learning mixture hierarchy (see Vasconcelos et al., "Learning Mixture Hierarchies," *NIPS* '98 (1998)). In particular, the EM algorithm is used both to match a query PDF to a set of PDFs and to create a PDF "hierarchy" for effectively representing multiple views of the same object in an object database. It should be noted that this same approach could also be applied to create a "virtual sample" of an object in a shot, as derived from the PDFs created from multiple training frames.

Figure 2:
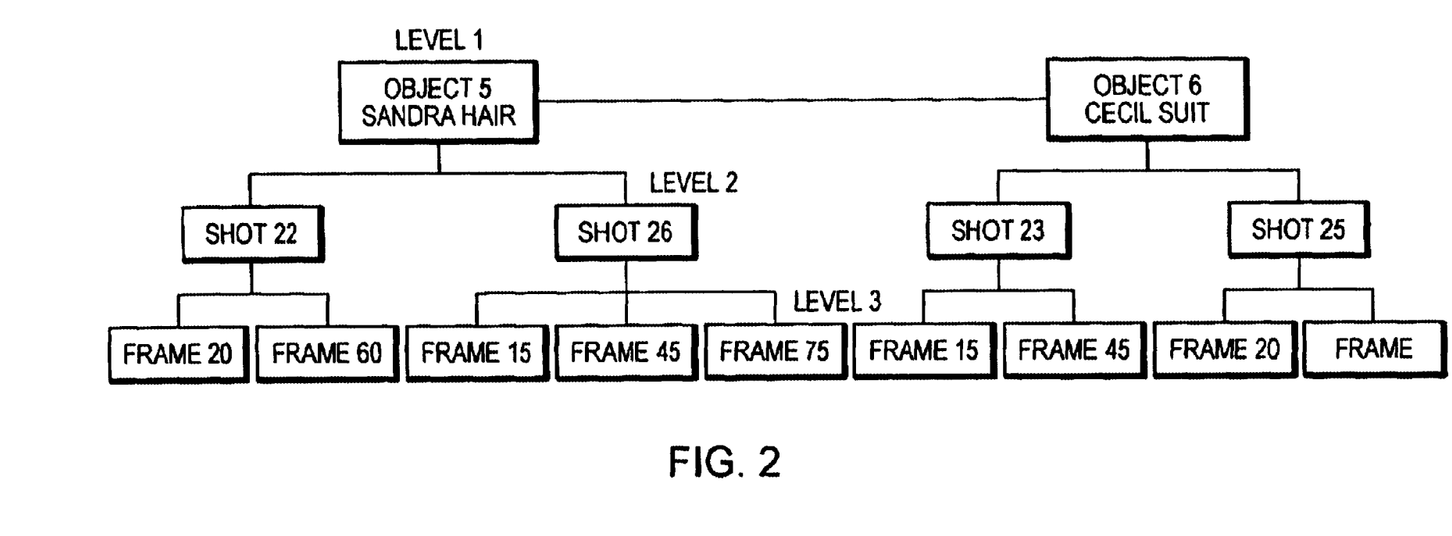
FIG. 2 diagrammatically illustrates a hierarchical ordering of probability density functions that facilitates efficient and accurate object searching.

The preferred hierarchy consists of three levels of PDF. As illustrated in FIG. 2, the lowest level (i.e., Level 3) are the individual PDFs calculated for an object from the training frames. These PDFs are utilized in computing a "virtual PDF" at the second hierarchical level that represents a composite of an object's appearances in a single shot. At the highest level (i.e., Level 1) are virtual PDFs computed from a plurality of Level 2 virtual PDFs; these highest-level PDFs are preferably the ones utilized in queries.

It is possible for a single object to possess more than one virtual representation in searches. This takes into account scenarios in which, for example, an object's color properties vary widely between two shots—e.g., a white shirt worn in a smoky lounge with bluish lighting and that same shirt worn outside in bright daylight. Rather than form a single composite of these two incarnations of the same object, which could very well fail to represent both at once, two virtual samples may be generated such that each is a strong candidate for respective future queries.

One way to help limit the time spent during a search is to quickly eliminate objects whose feature information differs by a significant amount. To implement this search step, indicated at 140a in FIG. 1, a separate object feature database is created. The feature database is preferably organized into sets of data bins, each set corresponding to a different feature parameter. In the case of color modeled as YIQ, illustrated in FIG. 3, each set of bins 310, 320, 330 repesents a single color channel. Each bin within the set, representatively indicated with a subscript corresponding to its ordinal location within the set, represents a single integer value of a color channel or a defined range of integer values. For example, the invention may utilize 32 bins 310, where each bin has a range of 8 Y values; 256 bins 320, where each bin represents a single I value; and 256 bins 330, where each bin represents a single Q value.

Figure 3:
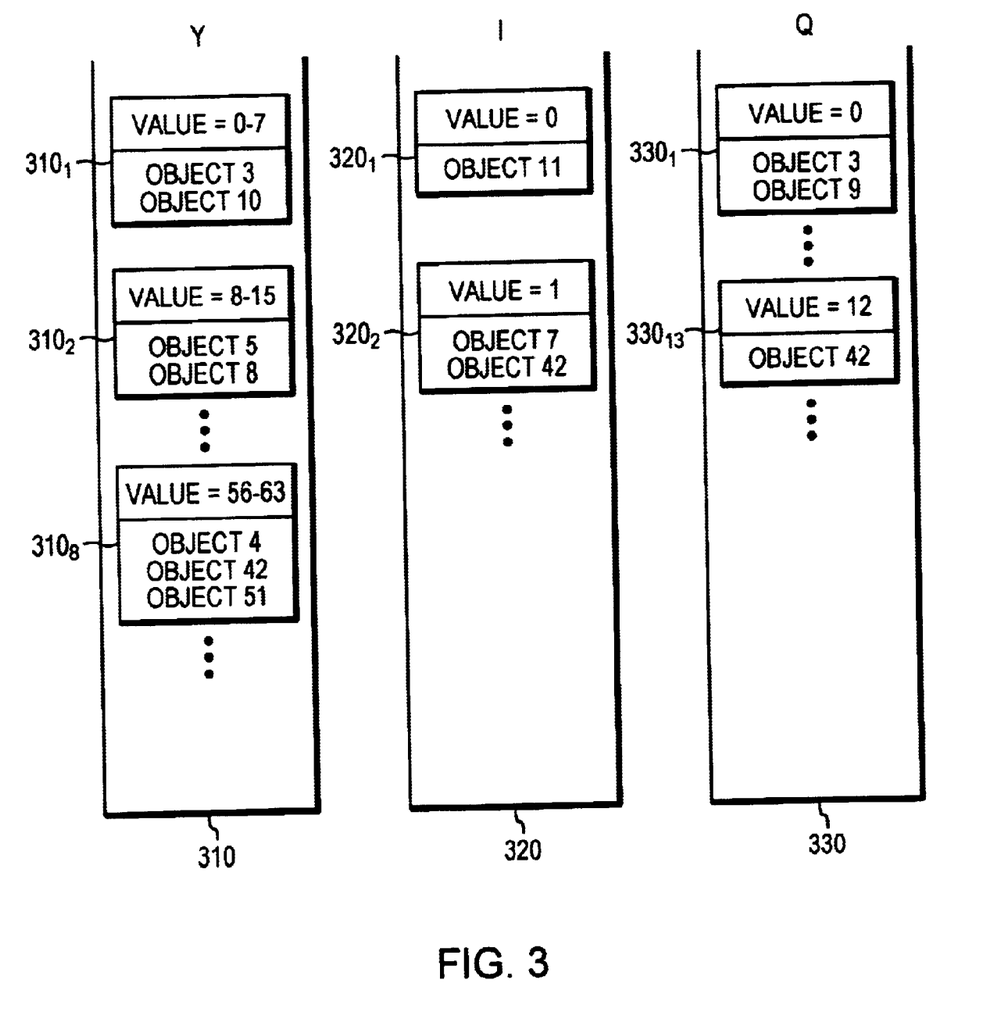
FIG. 3 diagrammatically represents a series of data bins used to sort objects by feature-parameter values.

When an object is identified for the first time, a number is computed by summing the product of each Gaussian's mean and weight for each channel's PDF. This number is an index for the channel's bin in which a marker for that object will be stored. Thus, if color is the only modeled feature, a marker will be stored in three sets of bins. When a search is conducted for a match for an as-yet unclassified object, the three weighted-mean color values for that object are initially computed. These three numbers are used to create a list of potential object matches by examining bins that are within a certain range around those three values (e.g., with bins defined as above, 3 Y bins, 5 I bins, and 5 Q bins). It is these values that will ultimately be used in the PDF-based search (indicated as step 140b in FIG. 1). The most stringent approach to matching eliminates, as potential candidates, objects lacking markers in all three color-channel bins within the defined search range. In other embodiments, the absence of bin matches is used to weight the overall likelihood of an object match rather than to eliminate objects from consideration entirely.

This additional "pre-search" step has the benefit of not only reducing the search space, but also expediting cases where a new object looks vastly different from all previously identified objects. If no objects have markers in each color channel's set of bins within a search range around a new object's weighted-mean values, then it is quite likely that the object is new to the database, and therefore the PDF comparison step is not necessary. Similarly, if there are only a very small number of objects whose weighted-mean values are within range of a new object's values, these objects can be displayed to the author as potential candidates without having to perform a PDF comparison. It should also be recognized that sorting known objects by feature-parameter values and subsequently searching for feature-value matches or near misses may, in some applications, represent a complete search strategy in itself.

One drawback to representing objects using feature data is that many disparate objects possess similar colors and textures; for example, a woman's neck and her arm, if similarly lit, will likely yield very similar visual information. This problem is addressed using an occurrence matrix, which keeps track of object co-occurrences within a single frame, as well as the number of frames in which each object appears. Each time the invention identifies a new set of objects, entries in this database are updated accordingly. This information is used to better distinguish a large set of objects that are ranked as being similar to a search object. As the number of objects classified in a shot increases, more information can be gleaned from this occurrence matrix about which other objects have often appeared within shots containing these already-classified objects. This information can be used to help choose among the candidates with close likelihoods so that objects which have appeared in shots with the already-classified objects are favored.

Figure 4:
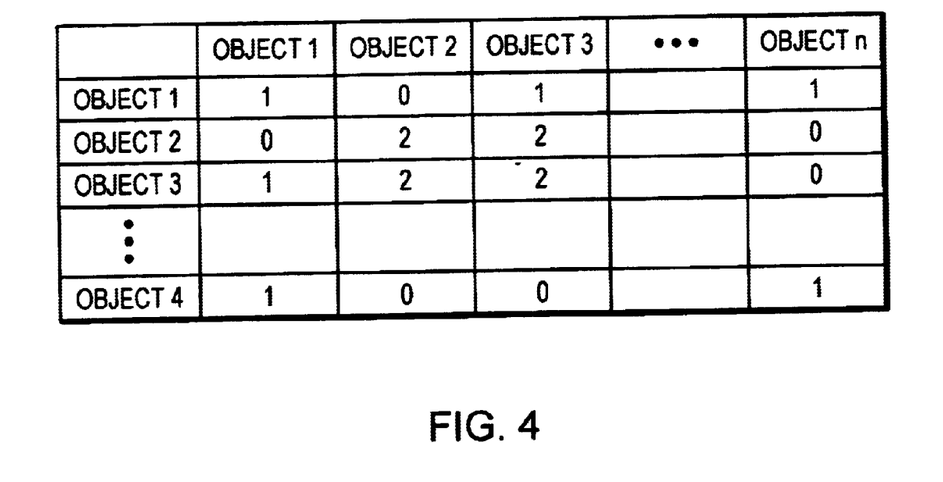
FIG. 4 diagrammatically represents an object-occurrence database used to keep track of object co-occurrences within a frame.

A representative example of an occurrence matrix appears in FIG. 4. Each entry off the primary diagonal indicates the number of frames in which the particular row and column objects co-occur. For example, Object 1 co-occurs once with Object 1 and once with Object n, but never with Object 2. The numbers along the primary diagonal represent the absolute number of frames in which an object occurs. In the preferred implementation of the present invention, the object-occurrence matrix is not employed during object queries for the first two shots that are authored during a session. This is because the matrix is created after the objects in the first shot are identified. If there are N objects in the first shot, the matrix is N×N and contains a "1" in every field to indicate that each object in the shot appears once with all of the other objects (its rows and columns will grow as new objects are added to the database). It does not make sense to employ the object-occurrence matrix during the classification of objects in the second shot, since all candidate objects have appeared once with all other candidate objects (so there is no data to distinguishes them).

Beginning with the third shot, the object occurrence matrix is desirably consulted during each object query, except for the first. During all subsequent queries, the iterative EM algorithm is employed using color information to determine the likelihood that each candidate object corresponds to the query object. Then, as indicatd at step 140c in FIG. 1, the entries in the object occurrence matrix are consulted for all of the objects that have already been identified in the shot (herein referred to as "labeled objects"). For each candidate object, a set of ratios is computed: the number of shots that included both the candidate object and a particular labeled object, divided by the total number of shots in which the candidate object has already appeared. Thus, for each candidate object, these ratios are computed for every labeled object; they are then summed and a mean ratio value is found. If the ratio is less than 0.5, the candidate object is eliminated from the query. Naturally, this process becomes more refined as the number of labeled objects increases during the classification of a shot.

4. Operation and Hardware Implementation

Figure 5:
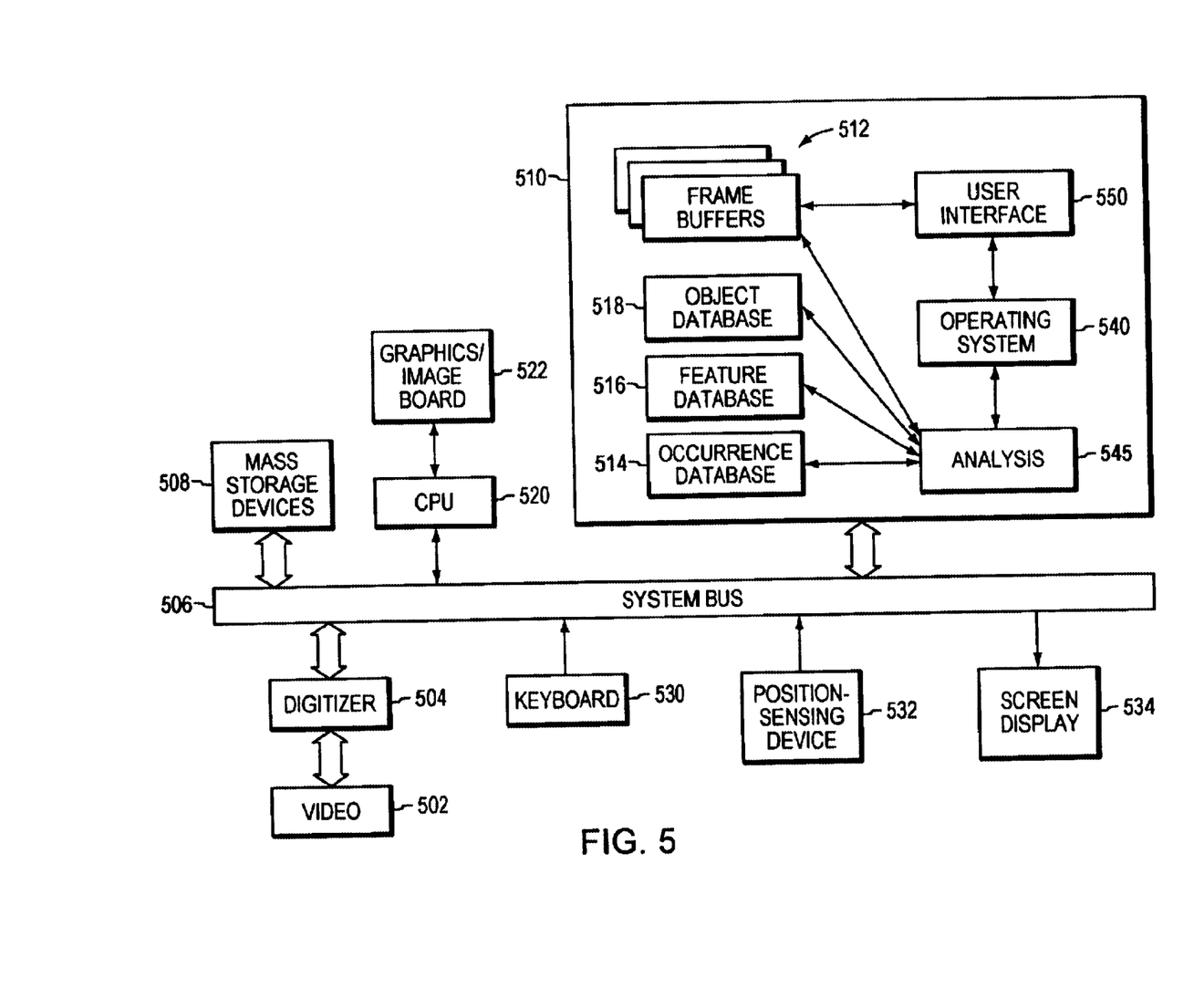
FIG. 5 schematically illustrates a representative hardware environment for the present invention.

Refer now to FIG. 5, which illustrates, in block-diagram form, a hardware system incorporating the invention. As indicated therein, the system includes a video source 502 (e.g., a video camera or playback device), which supplies the video sequence that will be analyzed and segmented. The output of video source 502 is either in digital form originally or is digitized into pixelmaps by a digitizer 504. The digitized video frames are sent as bitstreams on a system bus 506, over which all system components communicate, and may be stored in a mass storage device (such as a hard disk or optical storage unit) 508 as well as in a main system memory 510 (specifically, within a partition defining a series of image buffers capable of storing a sequence of video frames, and representatively indicated at 512). Memory 510 also includes a partition for the occurrence database 514; the feature database 516; and an object database 518, which maintains all properties associated with the objects, including feature-parameter values, actions, segmentation mask data, graphics, and text.

The operation of the illustrated system is directed by a central-processing unit ("CPU") 520. To facilitate rapid execution of the image-processing operations hereinafter described, the system preferably contains a graphics or image-processing board 522; this is a standard component well-known to those skilled in the art.

The user interacts with the system using a keyboard 530 and a position-sensing or pointing device (e.g., a mouse) 532. The output of either device can be used to designate information or select particular areas of a screen display 534 to direct functions to be performed by the system.

A group of modules that control the operation of CPU 220 and its interaction with the other hardware components is shown conceptually as located in a main system memory 510. Portions of the programs may physically be contained in other units conneced to the bus 506. In particular, an operating system 540 directs the execution of low-level, basic system functions such as memory allocation, file management and operation of mass storage devices 508. At a higher level, an analysis module 545, implemented as a series of stored instructions, directs execution of the primary functions performed by the invention, as discussed above; and instructions defining a user interface 550 allow straightforward interaction over screen display 534. User interface 550 generates words or graphical images on display 534 to prompt action by the user, and accepts user commands from keyboard 530 and/or position-sensing device 532.

The contents of each image buffer 512 define a "raster," i.e., a regular two-dimensional pattern of discrete pixel positions that collectively represent an image and may be used to drive (e.g., by means of image-processing board 522 or an image server) screen display 534 to display that image. The contents of each memory location in a frame buffer directly govern the appearance of a corresponding pixel on display 534.

It must be understood that although the modules of main memory 510 have been described separately, this is for clarity of presentation only; so long as the system performs all necessary functions, it is immaterial how they are distributed within the system and the programming architecture thereof. Likewise, although conceptually organized as grids, pixelmaps need not actually be stored digitally in this fashion. Rather, for convenience of memory utilization and transmission, the raster pattern is usually encoded as an ordered array of pixels.

As noted above, execution of the key tasks associated with the present invention is directed by analysis module 545, which governs the operation of CPU 520 and controls its interaction with main memory 510 in performing the steps associated with the invention. In particular, stored images are cycled through buffers 512 during the segmentation process. Using device 232, the author identifies training frames and highlights objects therein. The system stores, in database 518, each object's color PDF values, as well as the number of the frame in which the object is largest, and the count of those training pixels. Whenever the author provides training data for objects in a particular frame, the system stores the PDFs generated for the information in that frame, and compares the number of training pixels with the number contained in database 518. If it has a greater square area in the new frame, the new frame number and area is stored in place of the previous number in database 518; this is so that the frame in which the object is most visible is shown to the author at the point when s/he is asked to provide a description thereof. After the shot has been segmented, analysis module 545 applies the Hierarchical EM algorithm to each object's set of PDFs to create a Level 2 PDF of each object which, as previously explained, is a composite PDF that ideally incorporates information from each of the training frames.

When an author adds an action (e.g., a hyperlink) to the first shot in a sequence, the entry is posted, along with each object's Level 2 PDFs, to database 518. No search function is needed at this stage; the database is empty and it is assumed that the author labels duplicate objects to be a single object. A representative frame in which the object appears is shown to the author, and s/he is prompted to provide a category name and description. A weighted-mean value is then computed for each color channel PDF, and an object ID number representing the object is added into the corresponding bins in feature database 516. A data structure of the same ID number may also be created in a separate database (not shown) of "Level 1" virtual object PDFs. In this entry, the virtual PDFs formed by all Level 3 training frame PDFs in this first shot are stored. Copies of these Level 2 PDFs may also be stored in a data structure in another database (not shown) that will store all Level 2 PDFs generated for each object. The Level 3 (lowest-level) PDFs are not stored. The entries in these PDF databases are indexed in object database 518. Finally, occurrence matrix 514 is initialized: a "1" is written into every entry.

Analysis module 545 proceeds to identify and segment the second shot and to compute YIQ PDFs for the objects therein. For each object in the second shot, the weighted sum of the means of the PDFs for each color channel is computed. Analysis module 545 uses these values to index into the bins of feature database 516 that contain pointers to objects with similar color characteristics. After this list of similar objects has been compiled, analysis module 545 eliminates from the list objects that have already been identified within the current shot. If there four or fewer objects remain in the list, images of these objects are displayed to the author and s/he is asked if one of these match the query object. If there are more than four, analysis module 545 applies the iterative EM process using the query object's Level 2 PDF and the Level 1 PDFs of the candidate objects. Images of the four most likely objects are displayed to the author.

If one of these four candidates is a match, the Level 2 PDF is stored in the appropriate database, and a new Level 1 PDF is computed for the object that takes into account the new PDF. If none of them match, the author is asked to pick from the list of objects in the database (ordered by category). If the object was in database 518 (implying an error in identification), either its Level 1 PDF is updated or a new Level 1 PDF (and entry into the bins of feature database 516) is generated, depending on whether or not the object was found in a neighboring bin during the pre-search. If the object has not been classified in a previous shot, new entries for the object are created in all of the data structures.

For all subsequent shots, this properties-management procedure is repeated, only with the added inclusion of information from occurrence database 514, as previously described. After the objects for each shot have been classified, the values stored in the shot's segmentation masks are adjusted based on the "global number" of each object in the database. When the author has finished adding actions to all of the shots in the sequence, the invention will contain a set of segmentation mask frames, a database that has a description and category for each object, databases containing the Level 1 and Level 2 PDFs for each object, and the occurrence database that indicates how many times each object has appeared with every other object in the sequence.

Although the present invention has been described with reference to specific details, it is not intended that such details should be regarded as limitations upon the scope of the invention, except as and to the extent that they are included in the accompanying claims.

What is claimed is:

1. A method of classifying and assigning properties to unclassified objects in an unclassified image frame, the method comprising steps of:
   a. locating unclassified objects in the unclassified image frame;
   b. finding at least one basis image frame containing identified objects including at least some of the objects in the unclassified image frame, the identified objects having properties associated therewith, the properties including at least one action associated with selection of an object; and
   c. classifying the unclassified objects by locating corresponding identified objects in the at least one basis image frame, and assigning the classified objects the properties associated with the identified objects corresponding thereto.

2. The method of claim 1 further comprising the steps of:
   a. modeling at least some of the identified objects of the at least one basis image frame in terms of probability density functions with respect to at least one feature thereof; and
   b. modeling the unclassified objects in terms of probability density functions with respect to at least one feature thereof, unclassified objects being identified by locating corresponding identified objects based on the probability density functions.

3. The method of claim 2 wherein each image frame comprises an array of pixels, the objects in a frame comprising regions within the pixel array, the pixels having at least one feature parameter associated therewith, each feature of an object corresponding to at least one feature parameter associated with the pixels representing the object.

4. The method of claim 2 wherein the at least one feature is selected from the group consisting of color, texture, motion, and position.

5. The method of claim 4 further comprising the step of organizing a database of the at least one feature of the identified objects, the at least one feature having a plurality of feature parameters associated therewith, the database being organized by:
   a. defining, for each feature parameter, a series of data bins corresponding to selected values of the feature parameter; and
   b. associating, with each data bin, objects having feature parameters with values that accord with the values corresponding to the data bin.

6. The method of claim 5 wherein the located objects also have a plurality of feature parameters associated with the at least one feature thereof, the identifying step comprising:
   a. obtaining, for the located objects, values for the feature parameters;
   b. identifying, in the database, data bins corresponding to the located-object feature parameters;
   c. selecting identified objects associated with (i) the data bin corresponding to the located-object feature parameters and (ii) additional data bins having a selected proximity thereto; and
   d. comparing the probability density functions of the located objects in the unclassified image frame with the selected objects.

7. The method of claim 6 wherein the at least one feature comprises color, the plurality of feature parameters associated with color comprising chrominance and luminance.

8. The method of claim 2 wherein:
   a. the at least one basis image frame comprises a series of video frames organized into a sequence of shots and including at least one training frame in which objects have been manually identified; and
   b. the probability density functions of the identified objects include, for each identified object, (i) a series of third-order probability density functions each derived from a training frame in which the object appeared, (ii) a series of second-order probability density functions each derived from the third-order probability density functions within a single shot, and (iii) a first-order probability density function derived from the second-order probability density functions.

9. The method of claim 8 wherein:
   a. the unclassified image frame is one of a sequence of unclassified video frames constituting a shot, objects being located in the sequence of unclassified frames by manual identification in a plurality of selected training frames within the shot, followed by statistical comparison of the indicated objects with the frames in the shot that were not selected as training frames; and
   b. the probability density functions of the located objects include, for each located object, (i) a series of third-order probability density functions each derived from one of the training frames in which the object appeared, and (ii) a series of second-order probability density functions each derived from the third-level probability density functions;
   and further comprising the steps of:
   c. comparing the second-order probability density functions of the located objects in the unclassified image frame with the first-order probability density functions of the identified objects from the basis video frames to identify the located objects.

10. The method of claim 1 further comprising the steps of:
    a. organizing an occurrence database of the identified objects, the occurrence database tracking co-occurrence of objects within any single frame; and
    b. if the step of identifying unclassified objects by locating corresponding identified objects based returns, for a given unclassified object, a plurality of potentially matching identified objects, consulting the occurrence database to identify any of the potentially matching identified objects that have co-occurred in a frame with the unclassified object to thereby identify the unclassified object.

11. The method of claim 1 wherein:
    a. the located objects have a plurality of feature parameters associated therewith;
    b. the identified objects in the at least one basis image frame have a plurality of feature parameters associated therewith;
    and further comprising the steps of:
    c. organizing a database of the feature parameters of the identified objects, the database being organized by:
       i. defining, for each feature parameter, a series of data bins corresponding to selected values of the feature parameter; and
       ii. associating, with each data bin, objects having feature parameters with values that accord with the values corresponding to the data bin;
    d. obtaining, for the located objects, values for the feature parameters associated therewith; and
    e. identifying the data bins corresponding to the located-object feature parameters; and
       the identifying step comprising selecting, as identified objects potentially corresponding to the located objects, identified objects associated with (i) the data bin corresponding to the located-object feature parameters and (ii) additional data bins having a selected proximity thereto.

12. The method of claim 1 wherein at least some of the actions are hyperlinks.

13. Apparatus for classifying and assigning properties to unclassified objects in an unclassified image frame, the apparatus comprising:
    a. an analysis module for locating unclassified objects in the unclassified frame; and
    b. computer storage for storing at least one basis frame containing identified objects and including at least some of the objects in the unclassified image frame, the identified objects having properties associated therewith, the properties including at least one action associated with selection of an object;
    the analysis module being configured to classify the unclassified objects by (i) locating corresponding identified objects in the stored basis frames and (ii) assigning to the classified objects the properties associated with the identified objects corresponding thereto.

14. The apparatus of claim 13 wherein the analysis module is further configured to:
    a. model at least some of the identified objects of the at least one basis image frame in terms of probability density functions with respect to at least one feature thereof; and
    b. model the unclassified objects in terms of probability density functions with respect to at least one feature thereof,
    the analysis module identifying unclassified objects by locating corresponding identified objects based on the probability density functions.

15. The apparatus of claim 14 wherein each image frame comprises an array of pixels and further comprising a memory for storing the pixels, the objects in a frame comprising regions within the pixel array, the pixels having at least one feature parameter associated therewith, each feature of an object corresponding to at least one feature parameter associated with the pixels representing the object.

16. The apparatus of claim 15 wherein the at least one feature parameter is selected from the group consisting of color, texture, motion, and position.

17. The apparatus of claim 16 further comprising a database for storing the at least one feature of the identified objects, the at least one feature having a plurality of feature parameters associated therewith, the database comprising:
   a. for each feature parameter, a series of data bins corresponding to selected values of the feature parameter; and
   b. means for associating, with each data bin, objects having feature parameters with values that accord with the values corresponding to the data bin.

18. The apparatus of claim 17 wherein the located objects also have a plurality of feature parameters associated with the at least one feature thereof, the analysis module being configured to:
   a. derive, for the located objects, values for the feature parameters;
   b. identify, in the database, data bins corresponding to the located-object feature parameters;
   c. select identified objects associated with (i) the data bin corresponding to the located-object feature parameters and (ii) additional data bins having a selected proximity thereto; and
   d. compare the probability density functions of the located objects in the unclassified image frame with the selected objects.

19. The apparatus of claim 18 wherein the at least one feature comprises color, the plurality of feature parameters associated with color comprising chrominance and luminance.

20. The apparatus of claim 15 further comprising means for receiving a manual indication from a user, and further wherein:
   a. the at least one basis frame comprises a series of video frames organized into a sequence of shots and including at least one training frame in which objects have been manually identified by operation of the manual-indication means; and
   b. the probability density functions of the identified objects include, for each identified object, (i) a series of third-order probability density functions each derived from a training frame in which the object appeared, (ii) a series of second-order probability density functions each derived from the third-order probability density functions within a single shot, and (iii) a first-order probability density function derived from the second-order probability density functions.

21. The apparatus of claim 20 wherein:
   a. the unclassified image frame is one of a sequence of video frames constituting a shot, objects being located in the sequence of unclassified video frames by operation of the manual-indication means in a plurality of selected training frames within the shot, followed by statistical comparison of the indicated objects with the frames in the shot that were not selected as training frames; and
   b. the probability density functions of the located objects include, for each located object, (i) a series of third-order probability density functions each derived from one of the training frames in which the object appeared, and (ii) a series of second-order probability density functions each derived from the third-level probability density functions;
   the analysis module being further configured to compare the second-order probability density functions of the located objects in the unclassified video frame with the first-order probability density functions of the identified objects from the basis video frames to identify the located objects.

22. The apparatus of claim 13 further comprising an occurrence database of the identified objects, the occurrence database tracking co-occurrence of objects within any single frame, the analysis module being configured to locate, in the occurrence database, potentially matching identified objects that have co-occurred in a frame with the unclassified object to thereby identify the unclassified object.

23. The apparatus of claim 13 wherein:
   a. the located objects have a plurality of feature parameters associated therewith;
   b. the identified objects in the basis video frames have a plurality of feature parameters associated therewith;
   and further comprising a database of the feature parameters of the identified objects, the database defining, for each feature parameter, a series of data bins corresponding to selected values of the feature parameter and associating, with each data bin; objects having feature parameters with values that accord with the values corresponding to the data bin, the analysis module being further configured to
   c. obtain, for the located objects, values for the feature parameters associated therewith;
   d. identify the data bins corresponding to the located-object feature parameters; and
   e. select, as identified objects potentially corresponding to the located objects, identified objects associated with (i) the data bin corresponding to the located-object feature parameters and (ii) additional data bins having a selected proximity thereto.

24. The apparatus of claim 13 wherein at least some of the actions are hyperlinks.

* * * * *